United States Patent [19]
Perry et al.

[11] 3,995,270
[45] Nov. 30, 1976

[54] CONSTANT FALSE ALARM RATE (CFAR) CIRCUITRY FOR MINIMIZING EXTRANEOUS TARGET SENSITIVITY

[75] Inventors: Richard Prather Perry, Haddon Heights, N.J.; Harry Urkowitz, Philadelphia, Pa.

[73] Assignee: The United States of America as represented by the Secretary of the Navy, Washington, D.C.

[22] Filed: June 16, 1975

[21] Appl. No.: 587,171

[52] U.S. Cl. ............................. 343/7 A; 307/235 J; 328/116
[51] Int. Cl.² ........................................... G01S 7/30
[58] Field of Search .................. 343/7 A; 307/235 J; 328/115, 116

[56] References Cited
UNITED STATES PATENTS

| | | | |
|---|---|---|---|
| 3,487,405 | 12/1969 | Molho et al. | 343/7 A |
| 3,701,149 | 10/1972 | Patton et al. | 343/7 A X |
| 3,778,822 | 12/1973 | Bauer | 343/7 A X |

*Primary Examiner*—T.H. Tubbesing
*Attorney, Agent, or Firm*—Richard S. Sciascia; Paul N. Critchlow

[57] ABSTRACT

CFAR systems may become ineffective when extraneous targets present in threshold control cells raise the threshold detection level to such a point that the target in the cell being tested becomes obscured. The present circuitry locates the particular threshold control cell or cells having the extraneous target and eliminates it from the threshold detection level computation.

6 Claims, 6 Drawing Figures

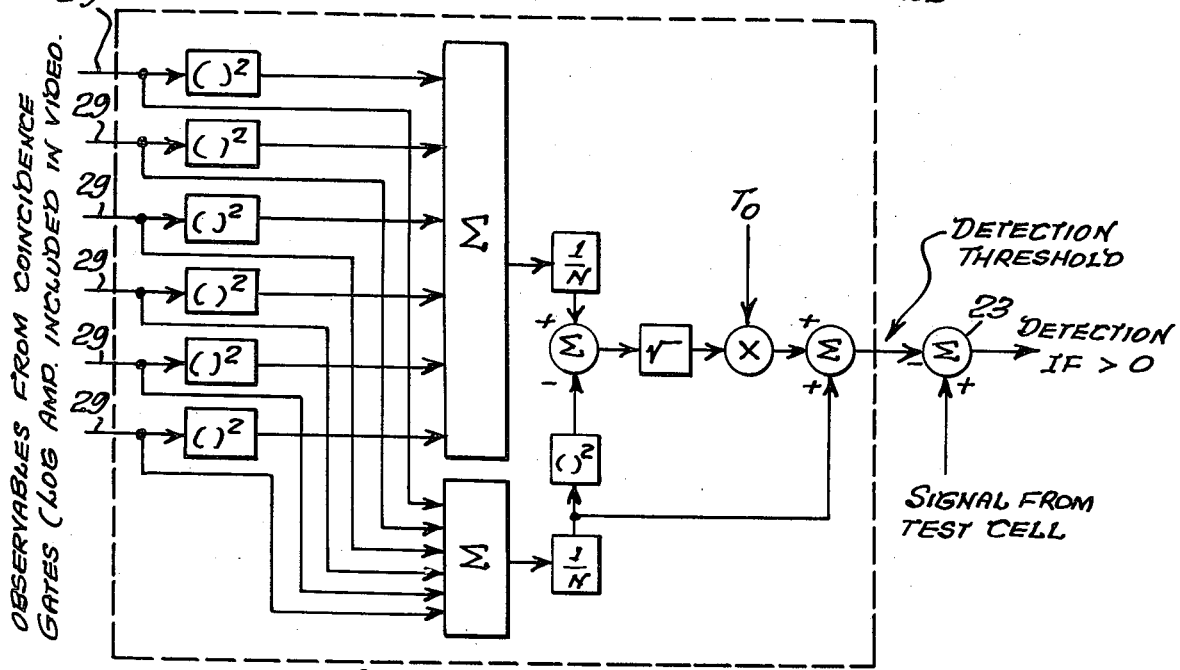
FIG. 5. CFAR PROCESSING WITH EXTRANEOUS TARGET REMOVAL FOR LOGNORMAL INTERFERENCE.
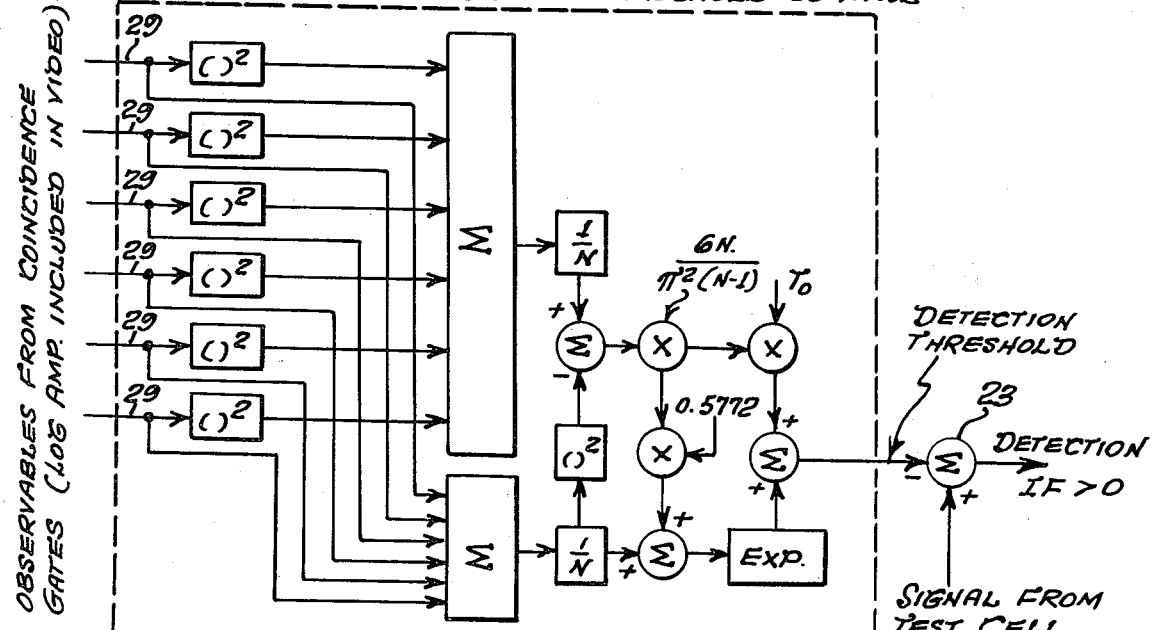
FIG. 6. CFAR PROCESSING WITH EXTRANEOUS TARGET REMOVAL FOR WEIBULL INTERFERENCE.

CONSTANT FALSE ALARM RATE (CFAR) CIRCUITRY FOR MINIMIZING EXTRANEOUS TARGET SENSITIVITY

BACKGROUND OF THE INVENTION

The present invention generally relates to CFAR signal processors. As is known, cell-averaging CFAR senses the environment in the vicinity of a test cell for the presence of a target and, based upon the sensed data, its environmental estimation controls a threshold level to make the false alarm probability constant. One difficulty, however, is that large extraneous reflectors, such as other targets and point clutter reflectors, may cause the threshold level to be raised to such a high level that the probability of target detection is seriously reduced.

A principal object of the present invention is therefore avoid the effect of extraneous targets by providing a CFAR processor capable of sensing their presence in one or more of the threshold control cells and of removing the targets from the computation which produces the threshold detection level.

A more specific object is to process the video from a radar sweep integrator in the manner and for the purpose outlined in the foregoing object.

There are a variety of techniques employed for CFAR processing. The ensuing detailed description focusses primarily upon the so-called simple cell-averaging processing. Other types which also will be briefly discussed include Logarithmic cell-averaging, Lognormal Interference processing and Weibull Interference. The following references provide supplementary data on these processing techniques:

1. H. M. Finn, R. S. Johnson, "Adaptive detection mode with threshold control as a function of spatially sampled clutter level estimates," RCA Review, Vol. 29, pp. 414–464, Sept. 1968.
2. V. G. Hansen, H. R. Ward, "Detection performance of the cell averaging log/CFAR receiver," IEEE Trans. Aerospace and Electronic Systems, Vol. AES-8, No. 5, pp. 648–654, Sept. 1972.
3. G. B. Goldstein, "False alarm regulation in log-normal and Wiebull clutter," IEEE Trans. Aerospace & Electronic Systems, Vol. AES-9, No. 1 Jan. 1973.
4. V. G. Hansen, "Generalized constant false alarm rate processing and an application to the Wiebull distribution," 1972 IEEE Symp. Info. Theory, Asilomar, Calif., Jan. 1972.

In general, the present processor is suitable for use in any type of processing where surrounding resolution cells sense the environment to establish a detection threshold. Thus, the present system applies whether the cells are range cells, doppler shift cells, or both, or any combinations of coordinates, including azimuth and elevation.

BRIEF DESCRIPTION OF THE DRAWINGS

The present invention is illustrated in the accompanying drawings of which:

FIGS. 4, 5 and 6 illustrate other embodiments.

DETAILED DESCRIPTION OF THE INVENTION

Figure 1:
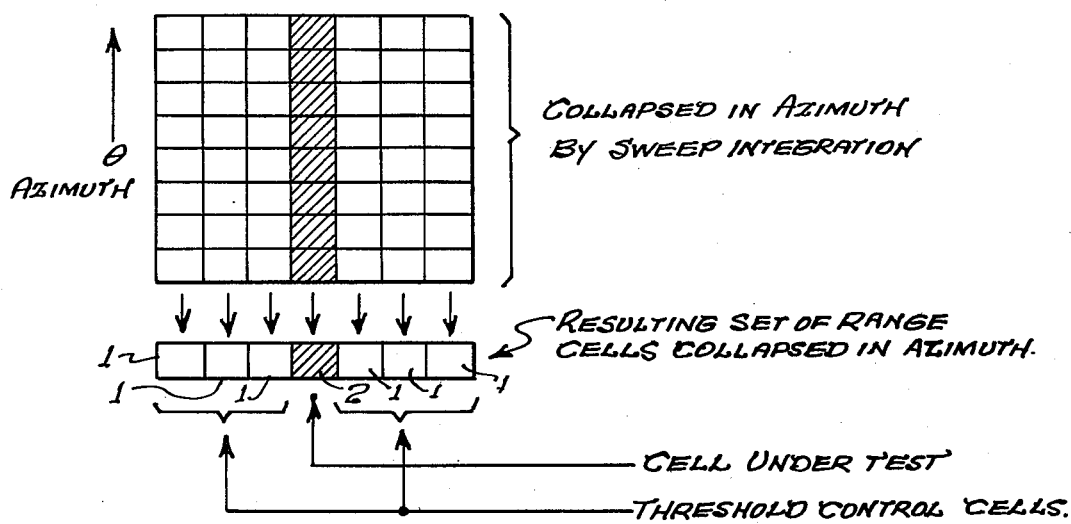
FIG. 1 schematically illustrates the action of a sweep integrator such as may be used to derive the signals to be processed.
Figure 2:
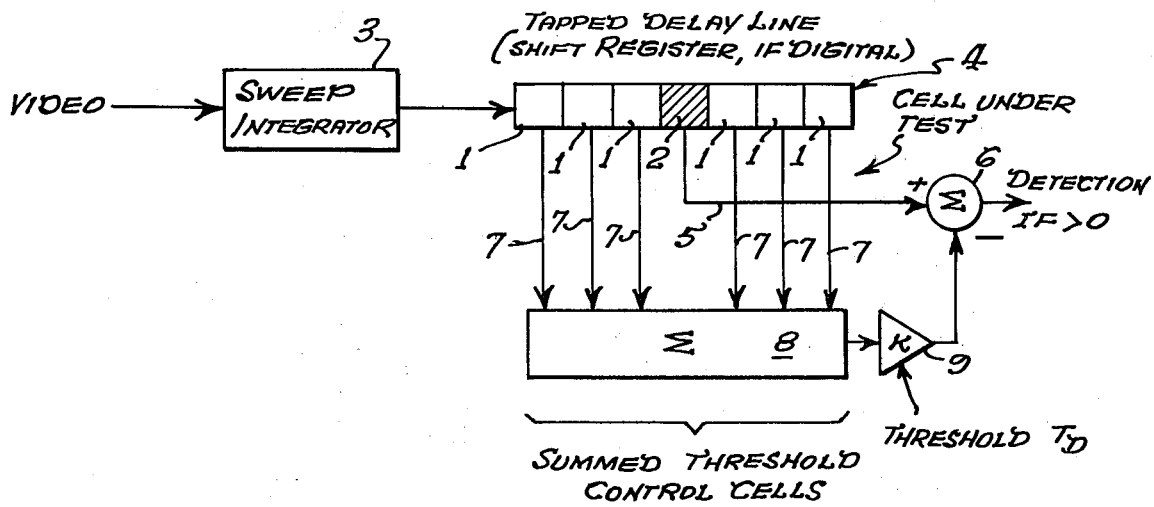
FIG. 2 is a schematic circuit diagram for a conventional, prior art video cell averaging CFAR technique using pulse to pulse integration.

FIGS. 1 and 2 illustrate the prior art cell-averaging CFAR processing as applied to situations concerned only with range cells. As shown in FIG. 1, the range cells are provided by the radar through video sweep integration. The range cells are collapsed in azimuth with the range resolution preserved. Cell-averaging is intended to provide a CFAR capability for detecting targets present in a particular cell being tested, this cell being identified as hatched test cell 2. Surrounding range cells 1 are control cells which provide environmental information used to set the threshold detection level for detecting the test cell target.

FIG. 2 illustrates a prior art technique employing the set of range cells 1 and 2 identified in FIG. 1 which are produced by sweep integrator 3. The integrator processes the video and applies it to a tapped delay line 4 which in digital applications can be a shift register. Delay line or register 4 thus provides a plurality of cells comparable to cells 1 and 2 of FIG. 1 and it advances incoming signals from cell to cell at a rate synchronized with the sweep integrator. Functionally, the circuit derives a threshold identified as $T_D$ and applies this threshold to a summer 6 for comparison with the output of test cells 2. Specifically, threshold control cells 1 apply their outputs through taps 7 to another summer 8 that, in turn, is applied to a multiplier 9 in which the sum is multiplied by a constant K that yields the desired threshold level. CFAR cell-averaging is based on the assumption that the echoes from threshold control cells 1 all come from the same statistical population. In particular, the population is assumed to have an exponential probability density function. Consequently, the presence of a strong scatterer, such as an extraneous target present in, for example, one of the control cells, may cause a violation of this assumption so that the system no longer is a valid CFAR system. The physical result is a raising of the threshold with a consequent loss in detectibility of a target in cell 2, the test cell. For this reason, some means is needed for determining when and in which cell such a substantial departure may exist and for removing that cell from the threshold level determination.

Figure 3:
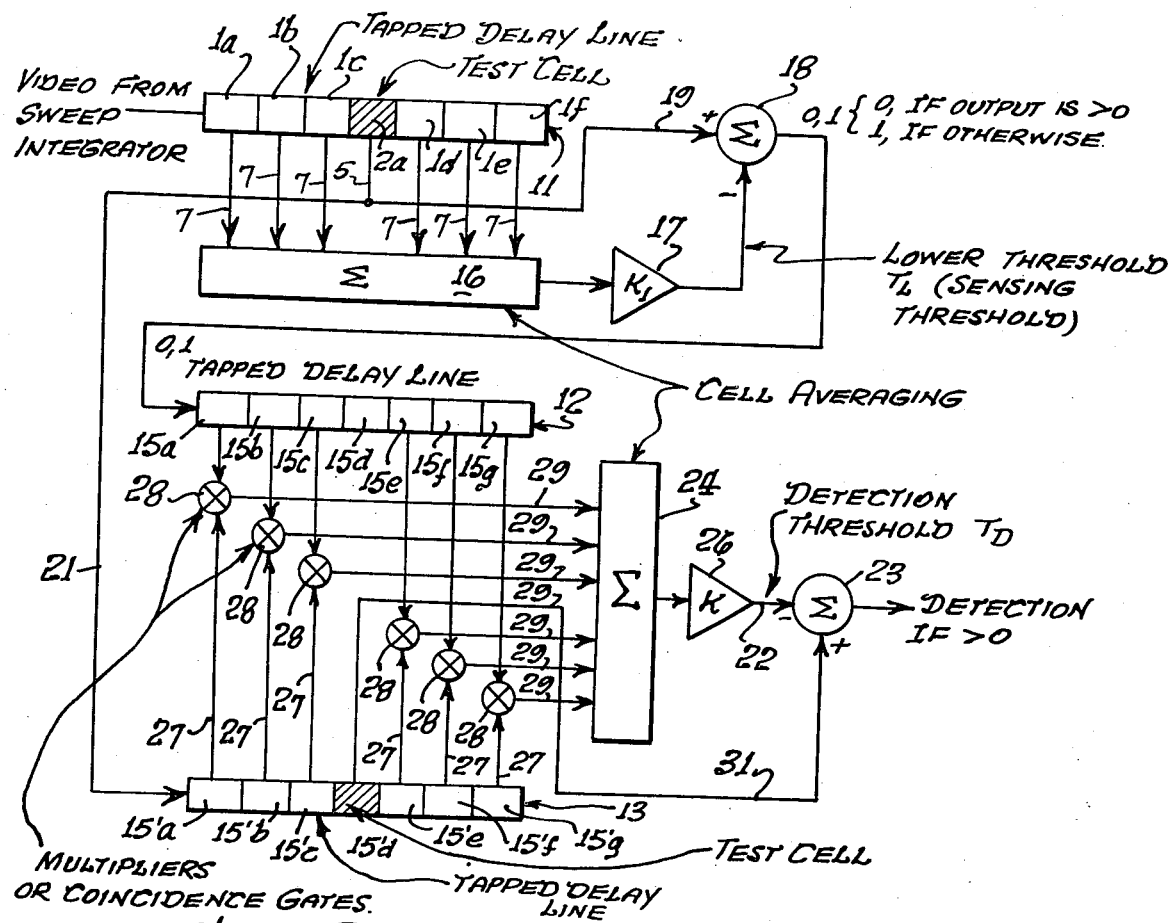
FIG. 3 is a schematic diagram illustrating one embodiment of the present CFAR processor.

As shown in FIG. 3, the present circuit for achieving this result includes three delay lines or registers identified as lines 11, 12 and 13 which, as will become apparent, are substantial counterparts one of the other. Line 11, as shown, is formed of a plurality of control cells, identified as cells $1_a$–$1_f$, and of a test cell designated cell $2_a$. The output of a sweep integrator is applied to cell $1_a$ and advanced from cell to cell continuously and synchronously with the input rate. Also, each of the cells is provided with a tapped output, identified as outputs 5 and 7. The rate of advance of the video input thus can be considered as the time of travel between the output of one of the cells to the output of the next succeeding cell.

Tapped delay lines 12 and 13 are, as noted, substantial counterparts of tapped delay line 11 to the extent that each of these delay lines also is formed into a plurality of cells through which input signals are advanced at the same rate as the rate of advance of delay line 11. Consequently, the cells of delay line 12 have numerical counterparts in delay line 13. Thus, the cells of delay line 12 are identified by numerals 15a–15g while the cells of delay line 13 are identified by numerals $15_a - 15_g$. However, it should be noted that delay line 13 includes a hatched test cell $15_d$ whereas delay line 12 has no such test cell. The other cells of line 13 again can be cumulatively regarded as 'control' cells.

The processing of the outputs of the cells of line 11 is similar to that previously described with reference prior art FIG. 2. Thus, each of the control cell outputs is applied its output 7 to a summer 16, which, in turn, is multiplied by a constant, $K_1$, to provide a threshold detection level identified as $T_L$. However, as will be noted, $T_L$ is applied to a so-called signal-generating comparison means 18 which may be considered as a conventional summer used to produce a zero or a one signal. Test cell $2_a$ also is applied through conductor 19 to the summer. Concurrently with this summation, the output of test cell $2_a$ also is conducted through line 21 into delay line 13.

As has been noted summer 18 primarily is a sampling and signal-generating component. In particular, it functions to generate inhibit or non-inhibit signals depending upon whether the output of test cell $2_a$ is greater than $T_L$ or not. In other words, the output of the test cell is compared with $T_L$ to produce either a 0 or a 1 signal, the 0 signal being produced if the output is greater than 0 and the 1 if otherwise.

It also is to be noted that each incoming signal from the sweep integrator eventually is advanced or progressed into test cell $2_a$ so that each cell is tested to produce either the 0 or 1 signal and each cell during its test also enters its signal into tapped delay line 13 through conductor 21. The rate of the sampling or testing conducted by summer 18 is performed at the same rate as the advance of the input from one cell to another in any one of the delay lines.

Another significant difference between prior art processing as represented by FIG. 2 is that the present multiplying factor $K_1$ is selected to provide a $T_L$ level lower than that normally used for detection purpose, i.e., $T_D$. The factors which may be used in determining the value of multiplier $K_1$ include such considerations as the need to provide a $T_L$ that is sufficiently high that interference (noise plus clutter) alone rarely will exceed it. In this regard, as will be explained, when $T_L$ is exceeded, inhibit signal 0 generated by summer 18 causes the particular signal that produced the excess to be dropped. Since it is desirable to retain rather than drop signals which represent interference by itself, $K_1$ should be high enough so that interference is not inhibited. On the other hand, relatively high strength signals such as may be derived from large extraneous reflectors or other targets obviously should be inhibited. Consequently, when such relatively high strength signals are present, an inhibit or 0 signal should be produced so that these higher strength signals can ultimately be eliminated. If high strength signals are not present, a non-inhibit or 'one' signal is desired. In this regard, it should be noted that the presence of several targets can raise $T_L$ even more so that, in general, the $T_L$ should be as small as feasible consistent with interference alone rarely exceeding the threshold.

If $P_{fL}$ is the probability that interference alone will cause $T_L$ to be exceeded, then in N threshold control cells, the average number which will have interference exceeding $T_L$ is $N P_{fL}$. This is the average number of cells which would be removed from the threshold control cells determining the detection threshold $T_D$. Therefore, $P_{fL}$ can be quite high, perhaps as high as 0.01 or 0.1 with negligible effect on the false alarm probability of the system.

The discussion of the conventional prior art cell-averaging noted the use of the detection level designated $T_D$ in FIG. 2. As may be noted, the same $T_D$ applies to the present apparatus. However, in FIG. 3 the $T_D$ is applied to a detection summer 23 through conductor 22. Also, in the system of FIG. 3, $T_D$ is derived from a conventional summer 24 and a multiplier 26 which uses a constant K. The constant K obviously sets the ultimate target detection level $T_D$ for the FIG. 3 system. In practice, it may be higher than the $T_L$ used for controlling the inhibit signals generation, although, of course, the actual $T_D$ level is a matter of operating selection.

The inputs for summer 24 are derived from the control cells of delay line 13, each of these cells having an output 27 coupled to a coincident gate 28 which, in turn, are coupled to summer 24 by conductors 29. Concurrently, the signal present in test cell $15'_d$ of delay line 13 is applied to final summer 23 through line 31.

The use of coincident gates 28 for each of the control cells of line 13 is an important feature of the invention in that it is these gates which block or prevent the application to summer 24 of extraneous relatively high signal levels present in any one of the control cells. The operation of coincident gates 28 is such that when a target echo is present in one of the control cells of line 13 simultaneously with the presence of an inhibit signal in a numerical counterpart cell of delay line 12 gate 28 blocks passage of the contents of the line 13 control cell into summer 24. Thus, if $15_a$ of line 12 has an inhibit signal, $15'_a$ is blocked. This blocking accomplishes the fundamental purpose of the present processor in that it precludes the averaging of the relatively high target echo signal present in cell $15'_a$ and thus prevents this target echo from affecting the $T_D$ level. Further, since tap delay lines 12 and 13 each are advancing the signals from cell to cell at the same rate the signals present in cells $15_a$ and $15'_d$ for application through line 31 to detection summer 23 which, of course, compares test cell $15'_d$ with the $T_D$. As indicated in FIG. 3 detection is made if the test cell level exceeds $T_D$.

As should be apparent, the system is feeding inhibit or non-inhibit signals into register 12 at the same time the signal in the test cell of register 11 is being applied through conductor 21 to register 13. Also, the nature of the signal in the register 11 is determining whether an inhibit or a non-inhibit signal is being entered into register 12. Thus, at any interval of time, the signal in any one cell of line 13, such as cell $15'_a$, represents the test cell signal from line 11 and, simultaneously, the line 12 numerical counterpart of that one cell (cell $15_a$) will have an inhibit or non-inhibit signal dependent upon the nature of the line 11 test cell signal that, as stated, is in cell $15'_a$. Since the serial input is being synchronously progressed from cell to cell in all registers, register 13 becomes filled and the question of whether or not it will be used in summer 24 depends upon whether or not it exceeds the $T_L$ threshold of summer 18. As stated, the coincidence gates block target strength signals and prevent their use in summer 24. In effect, the system, at any particular time interval, is testing the signal in the hatched test cell of register 13 against the average of all unblocked signals from the other cells which then are providing an environmental sensing for the test cell of line 13. The average derived from the unblocked signals then is modified by constant K to provide the desired threshold level $T_D$. The significant factor is that at that time, any extraneous large reflector signals present in the other control cells will be blocked so that they do not affect the control cell average and consequently, do not affect the validity of the target detection decision of summer 23.

As has been stated, the processor that has been described and illustrated in FIG. 3 is applicable to a broader class of CFAR techniques than the so-called cell averaging CFAR. Generally, it is applicable to all those techniques in which the environment is sensed by observing the output of a number of resolvable cells in the vicinity of the cell undergoing tests for the presence of a target. This applies whether the cells are range cells, doppler shift cells or both or any other combinations of coordinates, including azimuth and elevation. In an even broader sense, the principles apply to any ordinary signal processing regardless of the source of the signals providing the function of the processor is one of determining the presence of a target in a series of incoming signals.

It may be helpful to consider other methods for combining the echoes from neighboring cells to control the threshold and, in particular, to consider such other methods as are described in the previously-identified references. One such CFAR technique which is suitable for handling a very large dynamic range is the cell averaging log/CFAR receiver discussed in reference number 2. It is realized by using a logarithmic video rather than a straight video. In other words, the video signal is the logarithim of the IF envelope rather than the envelope or the square of the envelope. However, insofar as this CFAR circuit itself is concerned no change is required, and accordingly, FIG. 3 applies to logarithmic video.

An alternative to the use of a logarithmic video for a log/CFAR receiver simply is to put the logarithmic amplifier in the path leading from test cell $2_a$ of line 11 (FIG. 3) to register 13 or, in other words, in conductor 21. The use of such a logarithmic amplifier in conductor 21 is illustrated in FIG. 4 although, as will be noted, FIG. 4 also illustrates other modifications that may be utilized.

As to other, more general types of CFAR processing, it again can be recalled that the present principles are applicable to any type of CFAR processing in which cells neighboring a cell under test are used to control a threshold or used to generate a quantity which is to be compared with the output of the cell under test. The neighboring cells are used to produce some estimate of the environment and this estimate is used to control the threshold or the decision associated with the output of the cell under test. Such an idea is illustrated in FIG. 4 which shows a box labeled "Environmental Estimator" that uses only those neighboring cells which have not been inhibited by the coincident gates. Also, as already noted, a rectangle labeled "log amp" is included in this figure to show that the environment estimation and threshold control, as well as the output of the shaded test cell of line 13, may be obtained from the logarithm of the envelope. All other circuitry of FIG. 4 is the same as that previously described with reference to FIG. 3. However, it should be noted that the use of the environment estimation and threshold control takes the place of summer 24 and multiplier 26 of FIG. 3 in setting detection threshold $T_D$.

Figure 4:
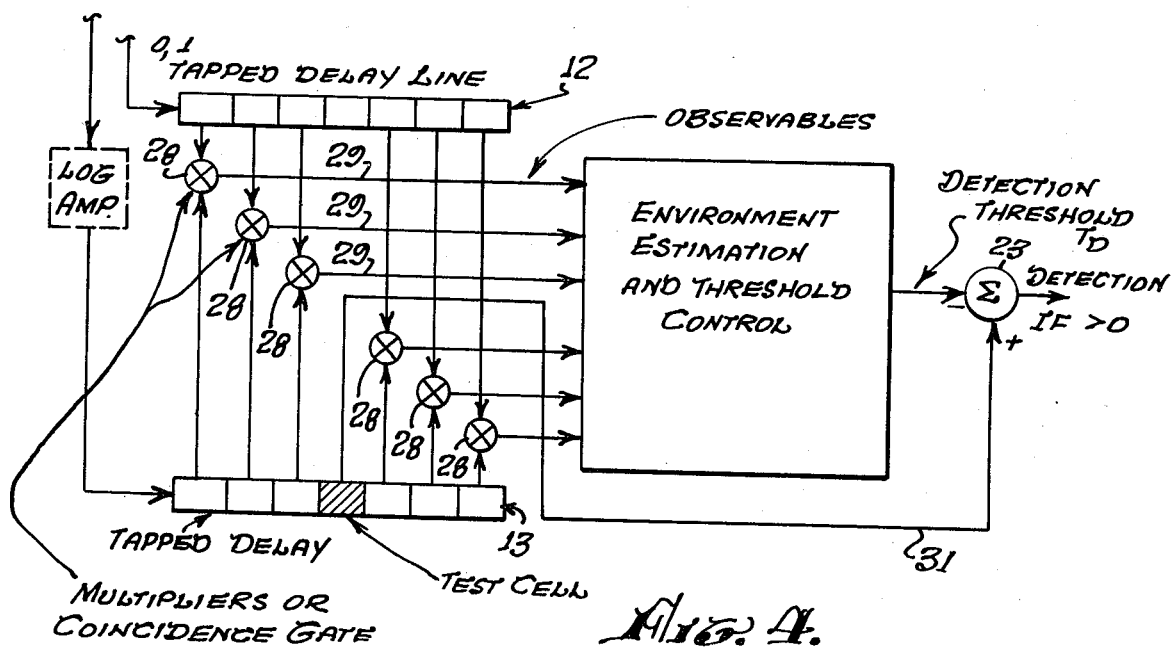

This FIG. 4 approach is capable of handling very general classes of CFAR processing. Two such classes are illustrated in FIGS. 5 and 6 and also described in references number 3 and number 4 respectively. Goldstein, in reference number 3 describes a CFAR technique suitable for interference whose probability density is lognormal. The basic observables are samples of the logarithm of the envelope. The process, insofar as environment estimation and decision statistic is concerned, is shown in FIG. 5 and to explain its action the following terminology is used. Let:

$v_o$ = video in the cell under test
$v_i$ = video in the neighboring cells
$N$ = number of neighboring cells used
$x_k = \ln v_K, k\ 0, 1, \ldots$ The test statistic is a quantity $t$ given by:

$$t = \frac{x_o - (1/N) \sum_{i=1}^{N} x_i}{\left\{ (1/N) \left( \sum_{i=1}^{N} x_i - (1/N) \sum_{j=1}^{N} x_j \right)^2 \right\}^{1/2}} \quad (1)$$

This is to be compared to a fixed threshold $T_o$. That is, a target is called if:

$$t > T_o \quad (2)$$

The test can be put into the form of a comparison of $x_o$ with a controlled threshold. By transposing in (1) and using (2), we can see that a detection is presumed if:

$$x_o > T_D \quad (3)$$

where:

$$T_D = T_o \left\{ (1/N) \sum_{i=1}^{N} x_i^2 - \left[ (1/N) \sum_{j=1}^{N} x_j \right]^2 \right\}^{1/2} + (1/N) \sum_{i=1}^{N} x_i \quad (4)$$

FIG. 6 illustrates a CFAR technique for the type of interference known as Weibull interference which has been derived by Hansen and described in his reference number 4. As shown, this technique uses the illustrated environment sensing and decision threshold.

Using the symbols given above, the test consists of comparing the log video $x_o$ out of the cell under test and comparing with a threshold $T_D$. A detection is presumed if $$X_o > \frac{T_o}{\hat{\eta}} + \hat{v} \quad (5)$$

where $$\hat{v} = \exp\left[ (1/N) \sum_{i=1}^{N} x_i + 0.5772/\hat{\eta} \right] \quad (6)$$

$$1/\hat{\eta} = \frac{6N}{\pi^2(N-1)} \left[ (1/N) \sum_{i=1}^{N} x_i^2 - \left( \frac{1}{N} \sum_{i=1}^{N} x_i \right)^2 \right] \quad (7)$$

The constant $T_o$ is determined by the desired false alarm probability. There seems to be no direct way to determine it analytically. Hansen 4 has obtained some design curves based upon computer simulation.

It is assumed that other modifications and applications of the present principles will be recognized. The fundamental advantage is due to the fact that it is relatively insensitive to the presence of nearby extraneous large targets. This fact assures that the threshold control cells represent a more homogeneous environment. Of course, a homogeneous environment does not absolutely ensure that a constant false alarm possibility will be achieved because the fluctuations statistics may not correspond to the assumptions made in deriving the threshold control algorithm. Thus, the CFAR techniques used may not be invarient with respect to the environment. Nevertheless, in the frequent situations where multiple targets occur, or where isolated large reflectors exist, the target invarient principles which remove these reflectors result in a significant reduction of losses.

Obviously many modifications and variations of the present invention are possible in the light of the above teachings. It is therefore to be understood that within the scope of the appended claims the invention may be practiced otherwise than as specifically described.

We claim:

1. A signal processor for establishing an environment threshold level for determining the presence of a target-strength signal in an incoming series of signals, comprising:

first, second and third signal-advancing delay line means each having a plurality of output taps forming each line into a plurality of spaced sequentially-arranged cells, all of said lines being adapted to receive a signal input in a first cell and advance said input from tap to tap at the same rate whereby said lines are formed of numerically-counterpart cells, said first delay line being receivably-coupled to said incoming signal series and at least one cell of said first and third lines being used as a 'test' cell while the other cells of said two lines are 'control' cells, signal-generating sampling means coupled to the output taps of said 'test' and 'control' cells of said first delay line for comparing the signal strength of the 'test' cell against that of the 'control' cells and generating as an output an 'inhibit' signal when said 'test' cell strength exceeds that of the 'control' cells; said 'test' and 'control' cell samplings and comparisons being performed synchronously with the advance rate of said delay lines, said second delay line being coupled to the output of signal-generating sampling means and said third line to said 'test' cell output of said first line whereby an 'inhibit' signal derived from any one of said samplings is received by said first cell of said second line simultaneously with the reception of a relatively high target-like signal in the first cell of said third line, said rate of advance of said lines advancing said entered signals simultaneously through said numerical counterpart cells of both of said lines, coincidence gates coupling the outputs of the 'control' cells of said third line with the outputs of said numerical counterparts of said second inhibit signal line, a third delay line averaging means coupled to said coincidence gates for providing as an output an average of said third line control cell outputs, and detection means coupled to the output of said averaging means and said third delay line 'test' cell for comparing said outputs and determining when said 'test' cell output exceeds said 'control' cell average, said coincidence gates blocking passage of a third delay line 'control' cell signal into said averaging means when an 'inhibit' signal is present in its numerical counterpart second line cell, whereby said averaging means can provide a truer environmental average unaffected by extraneous relatively high signal strengths present in the 'control' cells of said third line.

2. The processor of claim 1 wherein said signal-generating sampling means includes:

a comparison summer coupled to said first line 'test' cell, and a first delay line control cell averaging means receivably coupled to said first line 'control' cells and provided with an output coupled to said comparison summer, said first line averaging means including:

a control cell summer, and a multiplying means coupled to the control cell summer for multiplying its sum by a constant ($K_1$) to produce a threshold ($T_L$) for said comparison summer.

3. The processor of claim 2 wherein said processor is adapted for a log/CFAR radar receiver, said processor including a logarithmic amplifier in the circuit coupling said first line 'test' cell to said third delay line.

4. The processor of claim 2 wherein said third line averaging means includes:

a third line control cell summer coupled to said coincidence gates, and a multiplying means coupled to said third line summer for multiplying it sum by a constant (K) to produce said $T_D$ threshold for said detection means.

5. The processor of claim 4 wherein said $T_L$ threshold is lower than said $T_D$ threshold.

6. The processor of claim 5 wherein the value constant $K_1$ is related to the anticipated signal strength of noise and clutter interferences to the extent that only 'test' cell signals strengths exceeding said interference produce said inhibit signals.

* * * * *